Dec. 22, 1931.  J. YLLA-CONTE  1,837,935
PROCESS FOR THE OBTENTION OF SODIUM OR POTASSIUM METALS
Filed April 25, 1930
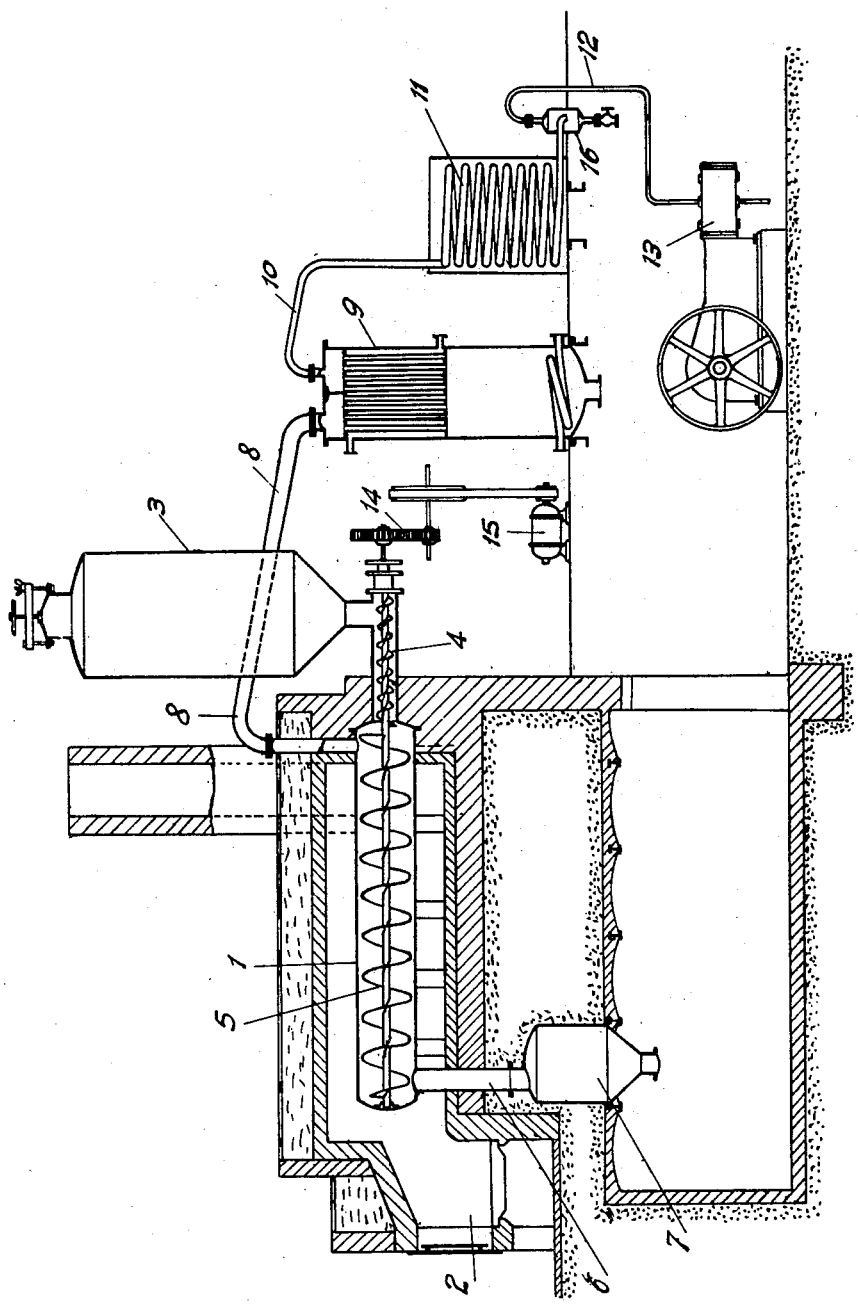
Inventor:-
José Ylla-Conte
by Langner, Parry, Card & Langner
Attys.

Patented Dec. 22, 1931

1,837,935

UNITED STATES PATENT OFFICE

JOSÉ YLLA-CONTE, OF BARCELONA, SPAIN

PROCESS FOR THE OBTENTION OF SODIUM OR POTASSIUM METALS

Application filed April 25, 1930, Serial No. 447,345, and in Spain April 27, 1929.

Metallic sodium and potassium, especially the former, can be used in great quantities in chemical industries, but the price resulting for these metals obtained by ordinary processes limits their uses.

Of all the processes known up to date for the obtention of these metals, the most simple and practicable consists in reducing by coal the carbonate or hydrate of sodium or of potassium. This process has the great drawback that, owing to the high temperature of the reaction, it requires a large consumption of fuel, and further, the reaction chamber is rapidly destroyed, thus resulting a very high price for the obtention of the sodium or potassium.

These drawbacks are avoided by the process of my invention, which consists in reducing by means of coal the carbonate or the hydrate of the metal, or a mixture of both, but by effecting the operation in a reaction chamber in which is maintained a constant depression or vacuum by means of a pump such as is used in the production of vacuum for industrial purposes.

By this process is obtained a considerable reduction in the temperature of reaction and consequently an economy in fuel and a much longer life of the reaction chamber. A greater celerity is obtained, besides, in the reaction, due to the fact that the vacuum pump is continuously exhausting the gases and vapours developed in the reaction, and lastly these reaction gases which consist of carbon oxide or a mixture of carbon oxide and hydrogen can be used as fuel or for other purposes.

In the accompanying drawing is shown in longitudinal section a plant appropriate to the working of this process.

The plant comprises a reaction vessel 1 of cylindrical shape, heated exteriorly by means of hearth 2 and charged by means of the feeding vessel 3. This feeding vessel is filled with the products which have to react composed of a mixture of carbonate and/or hydrate of the alkaline metal with coal. To this mixture may be added a small quantity of carbonate of lime or caustic lime, and it is expedient to dehydrate it before introducing it into the feeding vessel 3.

From the bottom part of the feeding vessel 3, this mixture is conveyed by the feedscrew 4 which introduces it continually in the reaction vessel 1. This reaction vessel 1 is provided with a screw 5 mounted on the same shaft as the screw 4 and which causes the material to advance slowly from the entrance end of the vessel to the exit end. In all this path the carbonate and the hydrate of sodium or potassium react with the coal, separating by tube 8 the vapours of sodium or of potassium, mixed with carbon oxide if the reaction is effected with carbonate, or else with carbon oxide and hydrogen if effected with hydrate. The residuum of the reaction, on reaching the end of the reaction vessel 1, falls through the exit tube 6 and accumulates in the lower chamber 7 from where it is extracted from time to time. The screws 4, 5 may be actioned in any appropriate way, the drawing representing as an example the transmission gear 14 and the motor 15.

The gases and vapours produced in the reaction pass through the tube 8 to the cooler 9 and hence through tube 10 to the second cooler 11. The cooler 9 is maintained preferably at a temperature slightly above 100° C. with the object that the sodium or potassium vapours are condensed, without freezing, so that the metal remains in a molten state, and accumulates itself at the bottom of the recipient, whence it can easily be removed. The second cooler 11 has for its object to cool the gases in order to reduce their volume and thus facilitate the work of the vacuum pump 13.

The cooler 11 ends at recipient 16 which collects the condensable liquids which might be dragged along by the gases, and through tube 12 communicates with vacuum pump 13 which absorbs the gases and thus constantly maintains a vacuum or depression in the plant.

The gases aspirated through the pump 13, which are formed as has already been explained by caroon oxide and/or by hydrogen, can be injected by pump 13 into a gasometer, in order to utilize them later as fuel or for other uses.

The heat of the combustion gases which go to the chimney after having heated the reaction vessel 1 may still be utilized to previously heat the air destined to the combustion, or else to dry and dehydrate the mixture of products which are to react.

I claim:—

1. Process for obtaining alkali metals sodium and potassium, consisting in treating with coal at a moderate temperature and under vacuum the carbonate or the hydroxid of the metal or a mixture of both, aspirating the gases and vapours developed in the reaction, and condensing the metallic vapours.

2. Process for obtaining alkali metals sodium and potassium which comprises mixing coal with carbonate or hydroxid of the alkali metal or with both, heating said mixture at a moderate temperature in a vessel in which a vacuum is maintained by constantly aspirating the gases and vapours developed in the reaction, and condensing the metallic vapours.

3. Process for obtaining alkali metals sodium and potassium which comprises mixing coal with carbonate or hydroxid of the alkali metal or with both, heating said mixture at a moderate temperature in a vessel in which a vacuum is maintained by constantly aspirating the developed gases and vapours and conveying these gases and vapours to a cooler in which the metallic vapours are condensed in a liquid or molten state.

4. Process for obtaining alkali metals sodium and potassium which comprises mixing coal with carbonate or hydroxid of the alkali metal or with both, heating said mixture at a moderate temperature in a vessel in which a vacuum is maintained by constantly aspirating the gases and vapours developed in the reaction, conveying these gases and vapours to a cooler maintained at a tempertaure slightly above the melting point of the metal, in order to condense the metal in a liquid state, and conveying the remaining uncondensed gases to a second cooler in which the gases are cooled and diminished in volume to facilitate the work of the vacuum pump.

In testimony whereof I affix my signature.

JOSÉ YLLA–CONTE.